United States Patent Office 3,738,812
Patented June 12, 1973

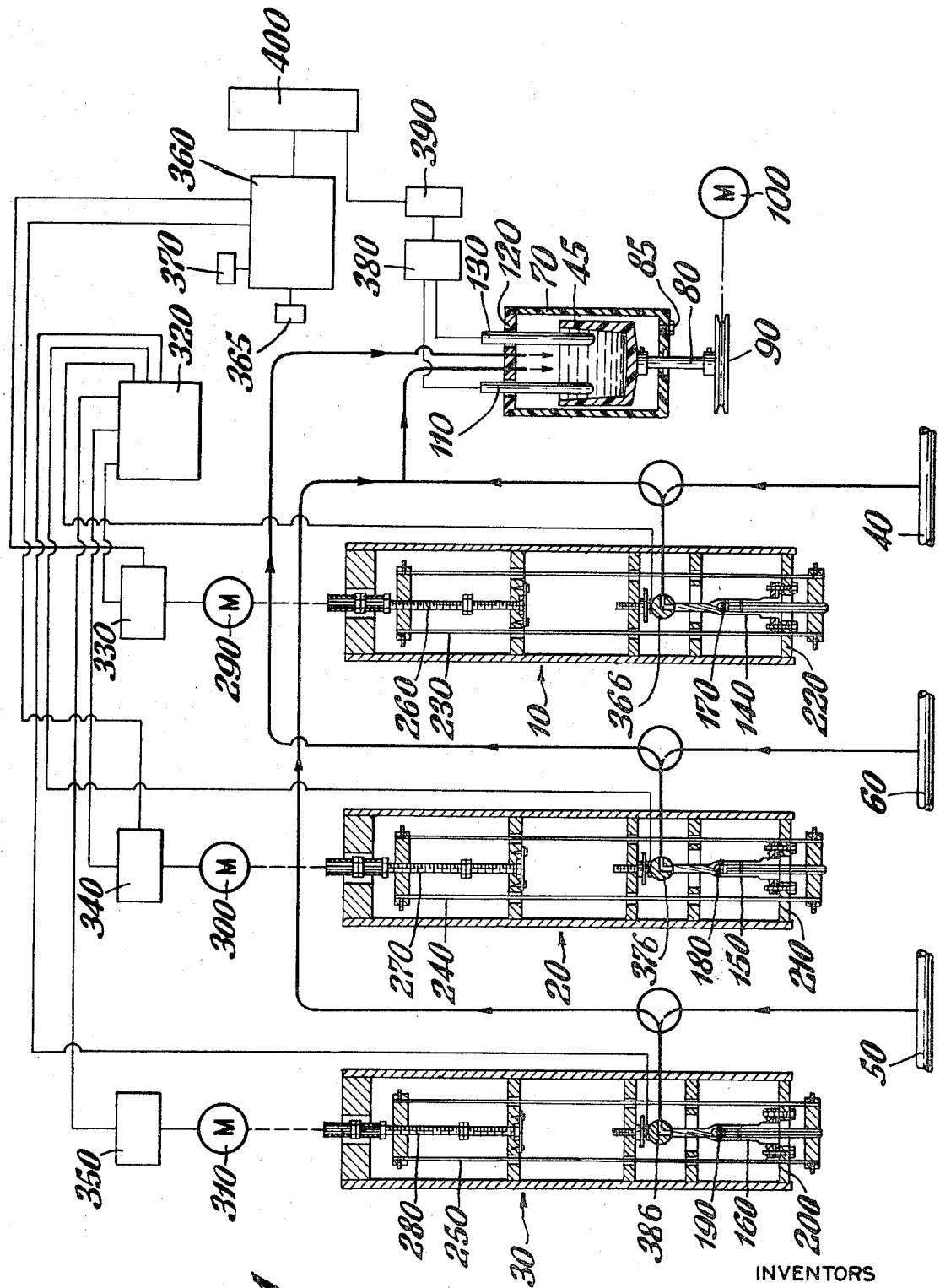

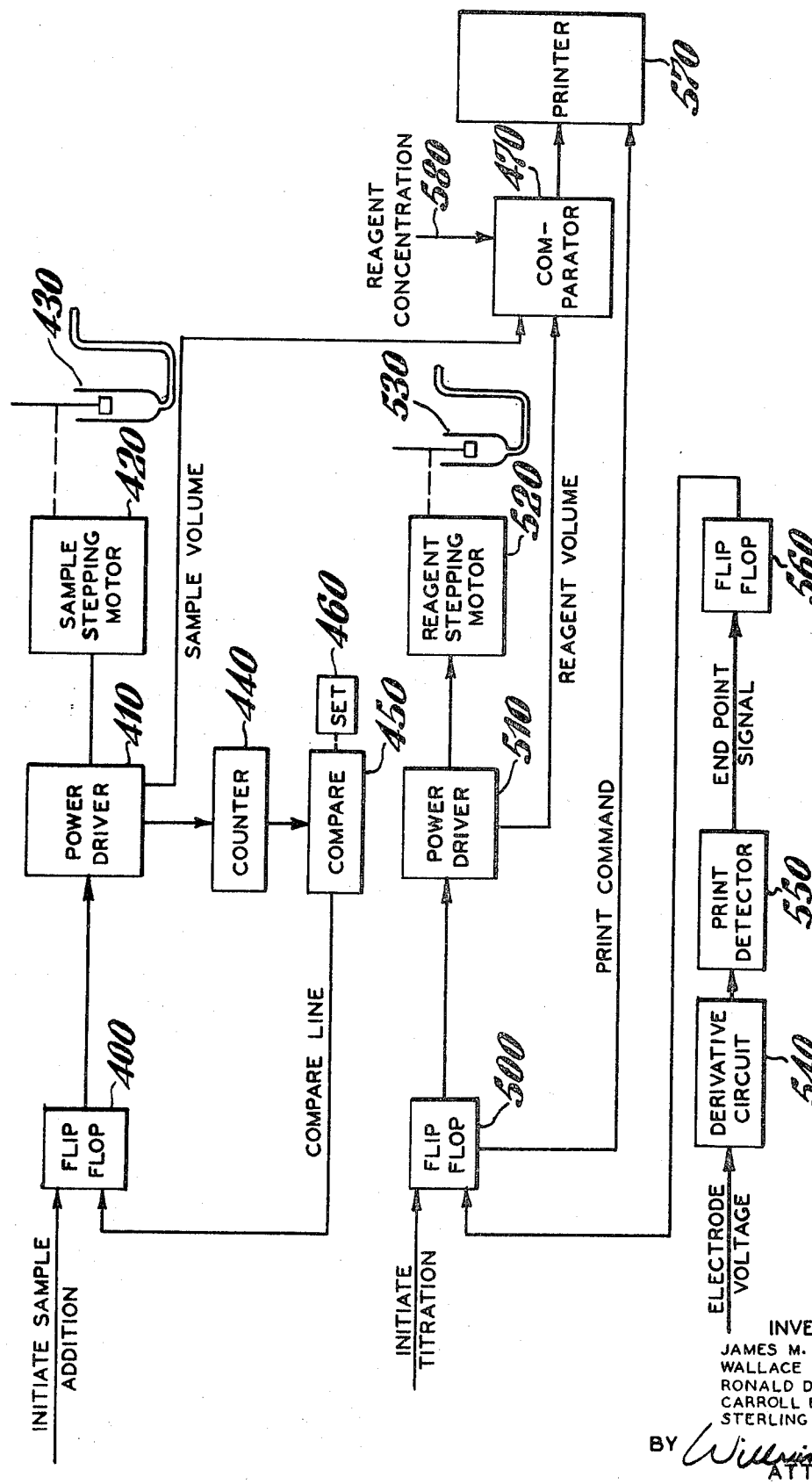

3,738,812
AUTOMATIC CHEMICAL ANALYZER
James M. Berry, South Charleston, Wallace E. Byrd and Ronald D. Dillon, Charleston, Carroll E. Dunn, Eleanor, and Sterling T. Martin, S.E. Charleston, W. Va., assignors to Ionics Incorporated
Filed July 27, 1971, Ser. No. 166,463
Int. Cl. G01n 27/36, 31/16
U.S. Cl. 23—253 R     5 Claims

ABSTRACT OF THE DISCLOSURE

Apparatus for measuring the concentration of a sample solution including means for mixing reagent solution of known concentration with a known volume of sample solution. Means are included to provide an electrical signal corresponding to the instantaneous concentration of a particular ion of the sample-reagent mixture. When the first derivative of the electrical signal is a maximum, means are provided to compare electrical signals corresponding to sample volume, reagent concentration and reagent volume to provide a signal corresponding to sample concentration.

---

Figure 2A:
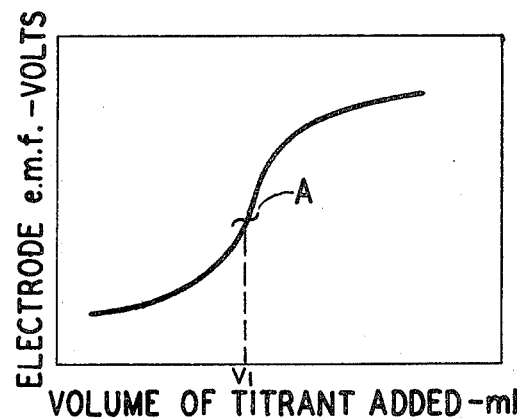

This invention relates to apparatus for determining the concentration of solutions. More particularly the present invention relates to apparatus for the automatic titration of a sample solution whereby the concentration of the sample solution is automatically determined.

Many applications in industry require the continuous measurement of fluid stream concentration. For example, there is the need to measure caustic concentration in acid-gas scrubber systems. The conventional way of doing this is to draw a sample of the caustic solution, transport the sample to an analytical laboratory, perform a laboratory titration analysis and relay the information back to the process unit. This practice involves a considerable amount of time, consequently effective process control cannot be readily achieved.

It is therefore an object of the present invention to provide apparatus for automatically and rapidly determining the concentration of solutions.

Other objects will be apparent from the following description and claims taken in conjunction with the drawing wherein FIG. 1 shows, partly in schematic, an apparatus in accordance with the present invention.

Figure 2B:
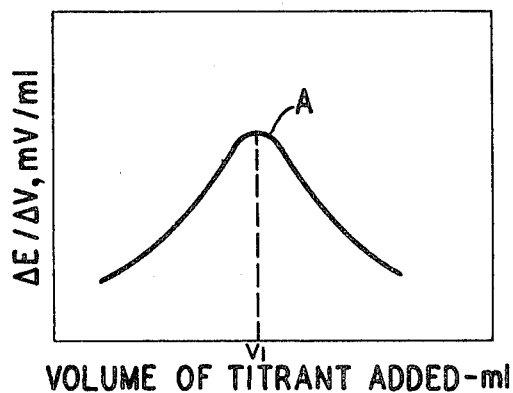

FIGS. 2(a) and 2(b) show curves illustrative of the potentiometric method of titration and FIG. 3 shows schematically the electrical portion of the apparatus of the present invention.

Apparatus for measuring the concentration of solutions in accordance with the present invention comprises a rotatably mounted vessel adapted to contain a mixture of the sample solution and a reagent solution; potentiometric measuring means are arranged within the vessel and the potentiometric measuring means provides an electrical signal corresponding to the concentration of a particular ion of the sample-reagent mixture in which the potentiometric means is immersed. Rotating means are provided to rotate the vessel containing sample and reagent whereby these constituents are mixed continuously and the mixture exposed to contact with the potentiometric means. Means are provided for introducing a predetermined volume of sample solution into the aforementioned vessel; means are also provided to produce an electrical signal corresponding to the predetermined volume of sample solution. Additional means are provided to gradually introduce reagent solution at a constant rate into the vessel containing sample solution and further means are provided to continuously measure the volume of reagent introduced and to provide an electrical signal corresponding to such volume. Means are also provided to produce an electrical signal corresponding to the concentration of the reagent solution. A detection device is provided for detecting the electrical signal provided by the potentiometric means and for further providing an electrical signal corresponding to the first derivative with respect to time of the electrical signal of the potentiometric means. A detection device is provided for determining when the first derivative signal is a maximum. Comparator means are provided and arranged to receive the electrical signals corresponding to sample volume, reagent volume and reagent concentration when the first derivative signal is a maximum and to provide an output signal corresponding to the concentration of the sample solution.

The present invention will be more fully understood with reference to the drawing.

With reference to FIG. 1, three identical burette assemblies are shown at 10, 20 and 30. Burette assembly 10 supplies a predetermined volume of sample solution from process line 40 to vessel 45; diluent or water, if desired, is supplied by burette 30 to vessel 45 from reservoir 50. Reagent solution is supplied from reservoir 60 to vessel 45 by burette 20. Vessel 45, which is suitably made of Teflon,[1] is enclosed in housing 70 and mounted on shaft 80 which is coupled via drive 90 to a variable speed motor 100. Variable speed motor 100 rotates vessel 45 to provide mixing of the vessel contents and to continuously expose sample-reagent mixture to the potentiometric means comprising indicator electrode 110 and reference electrode 120. At higher motor speeds, the contents of the vessel 45 are "dumped" from the vessel due to the taper of vessel 45, which is suitably on the order of six degrees, and the "dumped" mixture exits through drain 85. An indicator electrode 110, supported by housing cover 120, is arranged in vessel 45. When an acid-base titration is being performed the indicator electrode 110 is suitably a Beckman 41262 or Corning 476020 glass electrode which serves as a detector of the hydrogen ion concentration. The indicator electrode 110 consists of a silver-silver chloride electrode immersed in a dilute hydrochloric acid solution contained in a glass bulb. The silver-silver chloride electrode serves to make an electrical connection to the inner wall of the glass bulb. The concentration of the hydrochloric acid is not critical and a bufferred solution containing potassium chloride can be used instead. The variation of the electrode potential with the composition of the solution is due primarily to changes in potential across the glass-solution interface. This potential varies with the pH or hydrogen ion concentration of the solution according to the Nernst equation $$E = K - \frac{2.303 RT}{Fy} \mathrm{pH}$$

(where R is the molar gas constant, T is temperature in ° K., Fy is the Faraday constant, K depends on the temperature and on the composition of the glass). The mechanism on which this hydrogen ion response depends is not yet entirely clear, but the alkali metal ions at the glass-solution boundary are presumably capable of being exchanged for hydrogen ions in the solution. The glass consists of a network of $SiO_4$ tetrahedra containing interstitial alkali and alkaline earth metal ions. On passing an electric current through a glass membrane, hydrogen ions migrate through the glass. The activity of hydrogen ion in the silicate network is different from that of hy-

---

[1] Trademark of E. I. du Pont de Nemours and Co.

drogen ion in the solution, and it is this difference which gives rise to the observed potential. Reference electrode 130, supported by housing cover 120, is arranged in vessel 45 adjacent indicator electrode 110. Reference electrode 130, suitably a Beckman 39970 or Corning 476000, provides a steady potential of known value with respect to an arbitrarily fixed zero. The combination of the reference electrode and indicator electrode constitutes a titration or galvanic cell. The aforementioned reference electrode is a calomel electrode composed of metallic mercury covered with a thin layer of calomel ($Hg_2Cl_2$) in contact and in equilibrium with a solution of potassium chloride saturated with mercurous chloride. Electrical connection to the mercury is made by a platinum wire, and to the external solution by an asbestos fiber projecting through a minute hole in the base of the glass envelope.

In one embodiment of the present invention the operating principle is the same as that of any standard titration in that an acid of known normality (reagent) is slowly added to a known volume of basic solution (sample), or vice versa, thus varying the hydrogen ion concentration, until the mixed solution is neutralized into a salt and water.

For example:

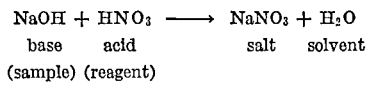

$$\underset{\underset{\text{(sample)}}{\text{base}}}{\text{NaOH}} + \underset{\underset{\text{(reagent)}}{\text{acid}}}{\text{HNO}_3} \longrightarrow \underset{\text{salt}}{\text{NaNO}_3} + \underset{\text{solvent}}{\text{H}_2\text{O}}$$

The neutralization (also called break point, end point, or equivalence point) is detected potentiometrically utilizing the indicator and reference electrodes previously described and hereinafter more fully described. When neutralization occurs, the amount of acid (volume) used is measured and with this information, together with acid concentration and sample volume, the concentration of the sample is calculated. Since a normal solution contains one milliequivalent weight in grams per milliliter of solution, it follows that the number of gram milliequivalents of substance present in a given volume of solution is represented by multiplying the number of milliliters of solution by the normality:

ml.×N=number of gram milliequivalents

One milliequivalent of any acid will neutralize one milliequivalent of base; or, when any acid A exactly neutralizes any base B, the number of gram-milliequivalents of the two substances must be equal:

$$ml._A \times N_A = ml._B \times N_B$$

or, $$\text{Volume of Base} = \frac{\text{Volume of Acid} \times \text{Normality of Acid}}{\text{Normality of Base}}$$

or, $$\text{Normality of Base} = \frac{\text{Volume of Acid} \times \text{Normality of Acid}}{\text{Volume of Base}}$$

Potentiometric titration, previously mentioned, is a titration whose end point is found by measurement of a number of points on the electrode E.M.F. vs. volume of titrant (reagent) added curve in the vicinity of the equivalence point. The end point coincides with the inflection point of a plot of electrode E.M.F. against the volume of reagent added. The analytical method used to locate the end point is based on the fact that the first derivative ($\Delta E/\Delta V$) is a maximum at the inflection point of the curve.

A characteristic titration curve and the corresponding first derivative curve are shown in FIGS. 2(a) and 2(b) respectively. The neutralization point (end point) is indicated at A in FIGS. 2(a) and 2(b). Using appropriate potentiometric means similar plots are obtained for all sample-reagent reactions such as those involving the precipitation or complexing of an ion of the sample solution.

In the apparatus of the present invention, with reference to FIG. 1 each of the burette assemblies 10, 20 and 30 include glass tubes 140, 150 and 160 in which are arranged pistons 170, 180 and 190. Glass tubes 140, 150 and 160 are fixedly mounted on supports 220, 210 and 200 while pistons 170, 180 and 190 are mounted on frames 230, 240 and 252 which are moveably engaged to calibrated lead screws 260, 270 and 280. Lead screws 260, 270 and 280 are respectively engaged to stepping motors 290, 300 and 310. Consequently, when stepping motors 290, 300 and 310 are actuated, pistons 170, 180 and 190 will either move up or down in glass tubes 140, 150 and 160, depending on the direction of rotation of the stepping motors.

In the operation of the apparatus of the present invention timer 320 provides a signal to power driver units 330, 340 and 350 which include a conventional pulse generator and power amplifier. A signal is also applied to 3-way solenoid controlled valves 366, 376 and 386 whereby glass tubes 140, 150 and 160 are put in communication with reservoirs 40, 60 and 50 respectively. Power driver units 330, 340 and 350 actuate stepping motors 290, 300 and 310 whereby pistons 170, 180 and 190 are lowered in glass tubes 140, 150 and 160 and fluid from reservoirs 40, 60 and 50 is drawn into the associated glass tubes in the manner of filling a hypodermic syringe. A further signal is applied from timer 320 to solenoid actuated valves 366, 376 and 386 whereby glass tubes 140, 150 and 160 are placed in communication with vessel 45. A signal is then applied from timer 320 to power driver unit 350 whereby a predetermined number of pulses are applied to stepping motor 310. These pulses are oriented so that stepping motor 310 turns in the direction opposite to that when tube 160 was being filled. Each pulse applied to the stepping motor 310 causes the lead screw 280 to advance a discrete amount thus introducing a measured volume of solvent from tube 160 into vessel 45.

A signal is next applied from timer 320 to power driver unit 330 whereby a predetermined number of pulses are applied to stepping motor 290, the orientation of the pulses being such that stepping motor 290 turns in the direction opposite to that when tube 140 was being filled. Each pulse applied to stepping motor 310 causes the lead screw 260 to advance a discrete amount thus introducing a measured amount of sample, e.g. NaOH, of unknown concentration from tube 140 into vessel 45. Each pulse applied to stepping motor 290 is also fed to conventional comparator device 360 to provide at comparator 360 a signal corresponding to the sample volume in vessel 45. Alternatively, sample volume information can be introduced to comparator 360 by means of a manual thumbwheel switch 370. Next in sequence, a signal is applied from timer 320 to power driver unit 340 whereby pulses are applied to stepping motor 300, the orientation of the pulses being such that stepping motor 300 turns in the direction opposite to that when tube 150 was being filled. The pulses applied to stepping motor 300 are spaced equally in time and causes lead screw 270 to advance whereby reagent solution, e.g. $HNO_3$, of known concentration is introduced into vessel 45 at a constant rate. Each pulse applied to stepping motor 300 is also fed to comparator device 360 to provide at comparator 360 a signal corresponding to the reagent volume in vessel 45. A signal corresponding to the known concentration of the reagent solution is also applied to comparator 360 by way of thumbwheel switch 365.

Electrode pair 110 and 130, immersed in the sample-reagent mixture, provide a continuous output voltage signal corresponding to the instantaneous concentration of the hydrogen ion (pH) of the reagent-sample mixture. The output voltage of electrodes 110 and 130 can be represented by the curve shown in FIG. 2(a) and this output voltage is applied to a conventional derivative circuit 380 which provides an output signal as illustrated in FIG. 2(b). The output signal from derivative circuit 380 is applied to conventional peak detector circuit 390. When the peak condition indicated at A in FIG. 2(b) occurs, a signal is transmitted from peak detector 390 to readout device 400 which can be a conventional printer, analog recorder, digital display. Also, the signal can be applied to process control equipment. Upon receiving this signal, which indicates neutralization, the computation of sample concentration at this time, from the input signals of sample volume, reagent volume and reagent concentration, is transferred from comparator 360 to the readout device or display means 400.

FIG. 3 of the drawing represents a somewhat more detailed illustration of the operation of the electrical portion of the apparatus of the present invention. With reference to FIG. 3 and the upper portion thereof, and "initiate sample addition" signal is shown being applied to a "flip flop" circuit 400. The "initiate sample addition" signal from the timer turns the flip flop 400 on which causes a series of pulses to be applied from the power driver unit 410 to the sample stepping motor 420 which is mechanically coupled to the sample burette 430. Each step of the stepping motor 420 moves the piston of the sample burette 430 a discrete distance and a known volume of sample is forced from the burette 430 into the titration cell (not shown). The pulses from the power driver 410 are also applied to a counter 440 which is connected to a compare unit 450 which has been set at a predetermined value as indicated at 460. When the pulse applied to the counter 440 reaches the "set" value the compare unit 450 sends a signal to the flip flop 400 turning the flip flop "off" to stop the pulses. Thus a known, predetermined volume of sample solution is transmitted from the sample burette 430 to the titration cell. Pulses from the sample stepping motor power driver 410 are also applied as shown to the comparator unit 470 to provide a signal corresponding to sample volume.

At the lower portion of FIG. 3 an "initiate titration" signal is shown being applied to another "flip-flop" circuit 500. The "initiate titration" signal from the timer turns the flip flop 500 "on" which causes a series of pulses to be applied from the power driver unit 510 to reagent stepping motor 520 which is mechanically coupled to the reagent burette 530. Each step of the stepping motor moves the piston of the reagent burette 530 a discrete distance whereby reagent is forced from the burette 530 into the titration cell (not shown) at a constant rate. Pulses from the reagent stepping motor power driver are also applied as shown to the comparator unit 470 to provide a signal corresponding to reagent volume.

A voltage signal from the titration cell electrode pair is received by the derivative circuit 540 and the derivative signal is applied to the peak detector unit 550. When the point corresponding to A in FIG. 2(b) is sensed by the peak detector unit, indicating neutralization, a signal is applied to "flip flop" 560 which transmits a pulse to "flip flop" 500, thereby "turning it off" and also causing a signal to be transmitted to printer 570, which then prints the computation provide by comparator 470 for the inputs of sample volume, reagent volume and reagent concentration. The known reagent concentration is "set" as indicated at 580.

While the foregoing description has been directed specifically to acid-base titration wherein the hydrogen ion concentration (pH) of a sample-reagent mixture is monitored (and the "end point" detected), the present invention is also suitable for determining the concentration of samples utilizing "end points" other than neutralization, e.g. precipitation, complexing and oxidation-reduction. For example, a NaCl sample solution can be treated with a AgNO₃ reagent solution and using an electrode such as Corning 476065 or Beckman 39261. The instantaneous concentration of chloride ion can be monitored and presented as an electrical signal similar to that shown in FIG. 2(a). The derivative of this signal will be a maximum at the "end point" where the chloride ion is essentially totally combined with silver ion. In analogy to the base-acid titration:

$$\underset{\text{sample}}{NaCl} + \underset{\text{reagent}}{AgNO_3} \rightarrow AgCl \downarrow + NaNO_3$$

Volume of Sample $$= \frac{\text{Volume of Reagent} \times \text{Normality of Reagent}}{\text{Normality of Sample}}$$

or

Normality of Sample $$= \frac{\text{Volume of Reagent} \times \text{Normality of Reagent}}{\text{Volume of Sample}}$$

Similarly sulfide containing sample solutions can be treated with reagents such as AgNO₃; calcium and magnesium containing sample solutions can be treated with ethylene diamine tetracetic acid. Also, lead containing sample soltuions can be treated with sodium chloride reagent and ferric iron containing sample solutions can be treated with ceric sulfate reagent. In general, all chemical analyses involving precipitation, complexing, and oxidation-reduction, are operable with the present invention.

Moreover, in addition to determining the end point by potentiometric measurement it can also be detected photometrically. For example, when color changes, precipitation, or complexing occurs at the end point, such changes can be detected by photometric means.

By way of example, when sulfide sample concentrations are being measured an Orion 94–16 electrode is suitable as the indicator electrode. For ferric iron and other oxidation-reduction analyses a Corning 476060 electrode can be used; for calcium and magnesium a Corning 4760235 electrode can be used.

Indicator electrodes for other sample solutions are available commercially. A partial listing is as follows:

Fluoride, Beckman 39600
Bromide, Beckman 39602
Iodide, Beckman 39606
Cupric, Beckman 39612

What is claimed is:
1. Apparatus for measuring the concentration of a sample solution which comprises
   (a) a rotatably mounted vessel adapted to contain a mixture of a sample solution and a reagent solution; potentiometric means including a pair of electrodes arranged within said vessel, said potentiometric means being adapted to provide an electrical signal corresponding to the concentration of a particular ion of a sample-reagent mixture in which said electrodes are immersed,
   (b) means for introducing a predetermined and measured volume of sample solution into said vessel,
   (c) means for providing an electrical signal corresponding to the predetermined and measured volume of sample solution,
   (d) means for gradually introducing reagent solution at a constant rate into said vessel,
   (e) means for rotating said vessel to cause mixing of sample solution and reagent solution introduced therein and to cause the mixture of sample solution and reagent solution to be exposed to contact with the said pair of electrodes,
   (f) means for continuously measuring the volume of reagent introduced into said vessel and for providing an electrical signal corresponding to said volume,
   (g) means for providing an electrical signal corresponding to the concentration of the reagent solution,
   (h) means for detecting the potentiometric electrical signal provided by said pair of electrodes and means for providing an electrical signal corresponding to the first derivative of the said potentiometric electrical signal provided by said pair of electrodes,
(i) means for detecting when the first derivative of the said potentiometric electrical signal is a maximum,
(j) comparator means arranged to receive the electrical signals corresponding to sample volume, reagent volume, and reagent concentration when said first derivative of the said potentiometric electrical signal is a maximum and to provide an output signal corresponding to the concentration of the sample solution.

2. Apparatus in accordance with claim 1 wherein the potentiometric means comprises a reference and indicator pair of electrodes which provide an electrical signal corresponding to the concentration of a particular ion of the soltuion in which they are immersed.

3. Apparatus in accordance with claim 1 wherein the output signal corresponding to the concentration of the sample solution is applied to display means.

4. Apparatus in accordance with claim 1 wherein means are provided for introducing a diluent solution to the said vessel.

5. Apparatus in accordance with claim 1 wherein the means for rotating said vessel are further adapted to provide for a rotating speed sufficient to dump or throw-out the liquid contents within said vessel after measuring the concentration of the sample solution.

References Cited

UNITED STATES PATENTS

| | | | |
|---|---|---|---|
| 2,627,453 | 2/1953 | Sheen | 23—253 |
| 2,950,178 | 8/1960 | Halfter et al. | 23—253 |
| 3,195,982 | 7/1965 | Nicholson | 23—253 X |

MORRIS O. WOLK, Primary Examiner

R. E. SERWIN, Assistant Examiner

U.S. Cl. X.R.

23—259, 292; 204—195 T; 324—30 R